United States Patent
Lee

(10) Patent No.: US 11,230,498 B2
(45) Date of Patent: Jan. 25, 2022

(54) CERAMIC PANEL INCLUDING SLAG AND STONE DUST

(71) Applicants: HAEWONMSC CO., LTD, Suncheon-si (KR); Hae Sik Lee, Gwangju-si (KR)

(72) Inventor: Hae Sik Lee, Gwangju-si (KR)

(73) Assignees: HAEWONMSC CO., LTD, Suncheon-si (KR); Hae Sik Lee, Gwangju-si (KR)

(*) Notice: Subject to any disclaimer, the term of this patent is extended or adjusted under 35 U.S.C. 154(b) by 0 days.

(21) Appl. No.: 16/897,736

(22) Filed: Jun. 10, 2020

(65) Prior Publication Data

US 2021/0002175 A1    Jan. 7, 2021

(30) Foreign Application Priority Data

Jul. 5, 2019    (KR) .......................... 10-2019-0081092

(51) Int. Cl.
    *C04B 35/01*    (2006.01)
(52) U.S. Cl.
    CPC .................................. *C04B 35/01* (2013.01)

(58) Field of Classification Search
    None
    See application file for complete search history.

(56) References Cited

U.S. PATENT DOCUMENTS

2004/0234487 A1* 11/2004 Bremser ............ C08G 18/4283
                                                            424/70.17

FOREIGN PATENT DOCUMENTS

| KR | 10-0208872 B1 | 7/1999 |
| KR | 10-2004-0016323 A | 4/2004 |
| KR | 10-1516981 B1 | 5/2015 |
| KR | 10-1566547 B1 | 11/2015 |
| KR | 10-1748486 B1 | 6/2017 |

* cited by examiner

*Primary Examiner* — Jeffrey D Washville
(74) *Attorney, Agent, or Firm* — Novick, Kim & Lee, PLLC; Jae Youn Kim

(57) ABSTRACT

A radon-free ceramic panel includes a mixture including two or more types of stone dust selected from among granite, basalt, limestone, dolomite, elvan, black stone, feldspar, and sandstone, along with waste slag and a non-phenolic adhesive. The ceramic panel is lightweight and has excellent fire resistance, heat insulation, corrosion resistance, water resistance, and ability to act as a bather to radon gas.

1 Claim, No Drawings

CERAMIC PANEL INCLUDING SLAG AND STONE DUST

CROSS REFERENCE TO RELATED APPLICATION

The present application claims priority based on Korean Patent Application No. 10-2019-0081092, filed on Jul. 5, 2019, the entire content of which is incorporated herein for all purposes by this reference.

BACKGROUND OF THE INVENTION

1. Field of the Invention

The present invention relates to a ceramic panel including slag and stone dust. More particularly, the present invention relates to a radon-free ceramic panel which includes two or more types of stone dust and waste slag and has excellent combustion resistance, durability, and ability to act as a bather to radon gas.

2. Description of the Related Art

Stone dust or stone dust of rock waste is waste that needs to be buried, and technology for recycling the stone dust into a building material by melting the same to form fibers has been developed. Korean Patent Nos. 10-1748486 and 10-1516981 disclose a method of manufacturing a mineral wool using a composition including an inorganic material containing silica. The composition including the inorganic material is melted and fiberized using a spinning process, thus manufacturing mineral wool.

Stone dust also includes inorganic material, so fiberized materials may be obtained through a fiberizing process thereof. These materials may be used to perform molding into various building materials.

In general, a cupola furnace or electric furnace disclosed in the prior art is used as a melting furnace for fiberizing. A cupola furnace is capable of being realized at a large size, so the productivity thereof is high. However, since coke is used as a heat source, greenhouse gases such as carbon dioxide are generated during melting, causing environmental pollution and a problem in which it is difficult to control the temperature in the furnace. Further, in the case of the electric furnace, the productivity thereof is low, but there are merits in that the emission of greenhouse gases is capable of being significantly reduced, temperature control of the furnace is easy, and high temperature conditions of 1,700° C. or higher are capable of being realized, thereby improving the homogeneity of the molten substances and realizing stabilized fiber quality.

However, a high temperature of 1,700° C. or higher, which is required in the process of fiberizing inorganic materials, raises production costs and thus acts as an obstacle to commercialization.

As technology for performing fiberizing at low temperatures, Korean Patent No. 10-0208872 discloses a technology that includes mixing stone dust, which is naturally obtainable at low cost, such as basalt, granite, dolerite, dolomite, limestone, and sandstone, with inexpensive byproducts obtained from industrial processes, such as molybdenum or steel slag and great ash, to thus manufacture a composition, followed by melting at about 1,200° C., causing fiberizing in an internal centrifugal spinner. However, there is a problem in that the moldability thereof is poor when the above raw materials are used, and thus it is difficult to manufacture a molded body such as a panel.

In general, when a building panel is manufactured using a stone material, as in Korean Patent No. 10-1566547, after blast-furnace slag, stone dust sludge, and quicklime are used to manufacture a paste, the paste is cured to manufacture a molded body. Alternatively, as in Korean Patent Application Publication No. 10-2004-0016323, stone dust and a ceramic material are melted at 1,300 to 1,600° C. and are then molded to manufacture a molded body. However, in the former case, it is difficult to ensure combustion resistance because the curing is performed at a low temperature, so the molded body in the former case cannot be applied as an incombustible product. In the latter case, the melting temperature is relatively low, but a fiberizing process is not performed, so the specific gravity of the product is high, which limits the use thereof.

Therefore, there is need for a technology for manufacturing a high-quality ceramic panel by enabling fiberizing at a reduced melting temperature.

PRIOR ART DOCUMENT

Patent Document

Korean Patent No. 10-1748486
Korean Patent No. 10-1516981
Korean Patent No. 10-0208872
Korean Patent No. 10-1566547
Korean Patent Application Publication No. 10-2004-0016323

SUMMARY OF THE INVENTION

Accordingly, the present invention has been made keeping in mind the above problems occurring in the related art, and an object of the present invention is to provide a radon-free ceramic panel which is manufactured using a material including slag and stone dust and which has excellent fire resistance, heat insulation, corrosion resistance, water resistance, and ability to act as a bather to radon gas.

Another object of the present invention is to provide a lightweight ceramic panel which is manufactured by fiberizing a mixture of slag and stone dust at a low temperature.

In order to accomplish the above objects, a ceramic panel of the present invention includes a mixture including two or more types of stone dust selected from among granite, basalt, limestone, dolomite, elvan, black stone, feldspar, and sandstone, along with waste slag and a non-phenolic adhesive.

The non-phenolic adhesive may include resin beads manufactured by mixing a urethane acrylate resin and a polyamide resin, and the urethane acrylate resin and the polyamide resin may be mixed at a weight ratio of 1:1 to 5:1.

Further, the mixture may include the slag and the stone dust mixed at a weight ratio of 3:7 to 5:5.

Further, the mixture including the slag and the stone dust may be a fiberized material having a density of 80 to 100 kg/m$^3$.

Further, the ceramic panel may have a thickness of 5 to 30 mm and a density of 600 to 1,500 kg/m$^3$ depending on the use thereof.

A ceramic panel according to the present invention is manufactured using a material including slag and stone dust, and has excellent fire resistance, heat insulation, corrosion resistance, water resistance, and ability to act as a bather to radon gas.

Further, it is possible to provide a lightweight ceramic panel which is manufactured by fiberizing a mixture of slag and stone dust at a low temperature.

DESCRIPTION OF THE PREFERRED EMBODIMENTS

Hereinafter, the present invention will be described in more detail. The terms or words used in the present specification and claims should not be interpreted as being limited to ordinary or dictionary meanings, but should be interpreted as having meanings and concepts consistent with the technical spirit of the present invention based on the principle that the inventor can appropriately define the concept of a term in order to explain his or her invention in the best way.

A ceramic panel according to the present invention includes a mixture including waste slag and two or more types of stone dust selected from among granite, basalt, limestone, dolomite, elvan, black stone, feldspar, and sandstone, and a non-phenolic adhesive.

The slag and the two or more types of stone dust may be mixed, and may then be preheated and melted at 800 to 1,400° C. to perform fiberizing. The manufactured fiberized material may be mixed with the non-phenolic adhesive and then molded, thus manufacturing the ceramic panel as described above. Further, oil and colored pigments may be additionally mixed during mixing with the non-phenolic adhesive, thereby realizing various colors or marble patterns in the manufactured ceramic panel. Further, sap of a lacquer tree or antibacterial paint may be applied on the entire surface or on a portion of the surface of the manufactured ceramic panel by performing spraying in a stippled pattern, thus manufacturing a ceramic panel subjected to eco-friendly antibacterial treatment and anti-pollution treatment. Further, an incombustible paint may be applied on the surface of the manufactured ceramic panel using a nozzle-printing method to produce various clear designs (flat or embossed) at high speed, or high-strength finish coating may be performed to manufacture a high-glossy panel. Further, a melamine-based LPM or HPM film may be attached to the surface of the manufactured ceramic panel using a hot-pressing or adhesive method, thus manufacturing an incombustible panel.

Further, the ceramic panel may be provided in a radon-gas moving passage formed in a concrete wall of a building for the purpose of preventing the leakage of radon gas.

The ceramic panel for manufacturing products for various purposes as described above may be used as a building and interior finishing material or furniture material. When the ceramic panel is used as a building material, physical properties of a thickness of 5 to 10 mm and a density of 1,000 to 1,500 kg/m$^3$ are required. When the ceramic panel is used as an interior finishing material or a furniture material, physical properties of a thickness of 10 to 30 mm and a density of 600 to 1,000 kg/m$^3$ are required. Accordingly, there is a problem in that it is difficult to satisfy the required physical properties due to the intrinsic characteristics of the panel containing stone dust.

To this end, the content of stone dust may be reduced, and the content of waste slag may be increased, or a large amount of low-density materials such as fly ash may be mixed therewith. In this way, however, the durability and processability of the panel are insufficient. Accordingly, in the present invention, a mixture including the stone dust and the waste slag mixed with each other is pre-heated and melted at a temperature of 800 to 1,400° C. to perform a fiberizing process, thereby reducing the density of the material.

As the stone dust, a mixture including two or more types of stone dust selected from among granite, basalt, limestone, dolomite, elvan, black stone, feldspar, and sandstone is used. Since the composition of the ceramic contained in the ceramic panel may be adjusted depending on the type and proper proportion of stone dust, desired physical properties may be obtained thereby. Preferably, granite and dolomite may be mixed. Through the mixing of the stone dust, the content of calcium oxide and magnesium oxide, having relatively low melting points, are maintained at an appropriate level, so fiberizing is possible even at a relatively low temperature. A fiberized material may be manufactured using only one type of stone dust. However, since there is a problem in that it is difficult to obtain a composition suitable for reducing the melting point, two or more types of stone dust are used in combination.

Further, byproducts generated in various processes are used as the slag, and examples of such slag may include steel slag and blast-furnace slag. It was found that sufficient fiberizing was possible even at 1,400° C. or less when the content of calcium oxide and the content of magnesium oxide were 20 to 30 wt % and 5 to 10 wt %, respectively, in the entire stone dust of the mixture including the waste slag and the stone dust mixture mixed therein. This is corroborated by the description that liquefaction is accomplished at 1,225° C. or less when the content of calcium oxide is 8 to 20 wt % and that the content of magnesium oxide is 1 to 9 wt % in a composition containing stone dust in Korean Patent No. 10-0208872, which is a conventional technology. In particular, when the content of magnesium oxide was increased, it was found that the temperature in a melting process could be reduced to 1,350° C. or less and that fiberizing smoothly progressed through the reduction in the melting temperature.

Further, it is preferable that the slag and stone dust be mixed at a weight ratio of 3:7 to 5:5, and it was found that it was possible to improve the heat insulation performance and the heat resistance performance by performing mixing at the above ratio. Further, before the slag and the stone dust are fiberized, solidification into a pellet form may be performed. In this case, it is preferable to manufacture pellets at a size of 20 to 30 mm in consideration of the efficiency of the solidification and addition processes.

The mixture of the stone dust and the waste slag may be melted to manufacture a molten substance, and the molten substance may be then fiberized to obtain a low-density material. The fiberizing process may be performed using a high-speed turbine. When the mixture is scattered using the high-speed turbine, fibers having a thickness of 3 to 7 μm and a length of 300 mm or less are manufactured. The fiberized material has a density of 80 to 100 kg/m$^3$ and is lower in density than the raw material. Further, the high-speed turbine is not particularly limited, as long as it is a typical high-speed turbine.

Further, in general, a pendulum system for stacking raw materials in a zigzag manner is applied in order to collect the fiberized material. However, in the present invention, the fiberized material may be easily collected without the application of such a pendulum system.

In order to mold the mixture subjected to the fiberizing process, additives such as adhesives are mixed therein, and a non-phenolic adhesive is used as the above adhesive. This enables an eco-friendly manufacturing process. After mixing with the fiberized material, dispersion and molding processes are performed by pressing and heating. Further, in the molding process, first low-pressure molding may be performed using a heated rolling mill, followed by second high-pressure molding, thereby improving the physical properties of the manufactured ceramic panel.

Further, the manufactured ceramic panel may be cut as desired according to specifications, and the manufactured panel may be naturally dried at room temperature and then packaged for commercialization.

As the non-phenolic adhesive suitable for the molding process, resin beads, manufactured by mixing a urethane acrylate resin and a polyamide resin, are used. After mixing with the fiberized material in a solid phase, pressing and heating are performed to a desired thickness of the ceramic panel using a press, which enables the resin beads to be melted and mixed with the fiberized material, thus forming the ceramic panel, which is a molded body.

A chain extender or acrylate may be added to polyols, selected from among polyester polyols and polyether polyols, and isocyanates, selected from among toluene diisocyanate (TDI), diphenylmethane diisocyanate (MDI), tetramethylxylene diisocyanate (TMXDI), isophorone diisocyanate norbornene diisocyanate, and hexamethylene diisocyanate (HDI), to thus perform a polymerization reaction, thereby manufacturing the urethane acrylate resin constituting the resin bead. The manufactured urethane acrylate resin does not contain harmful components such as phenols, and thus enables an eco-friendly process.

The urethane acrylate resin is mixed with the polyamide resin and then dried to manufacture the beads. Since the polyamide resin is mixed to improve the heat resistance of the adhesive, it is possible to prevent a reduction in dispersibility and physical properties when molding is performed at high temperature and high pressure. Further, examples of a process for manufacturing the beads may include a typical process for manufacturing a resin bead, and if necessary, a suitable amount of an organic solvent may be mixed with the resin mixture, and the beads may be manufactured using a bead-manufacturing apparatus.

It is particularly preferable for the polyamide resin to have a phenyl group bonded to the main chain thereof. To this end, aromatic dicarboxylic acid and aliphatic diamine may be polymerized to manufacture the polyamide resin. Preferably, the polyamide resin may be manufactured using a reaction of amine, such as trimethylenediamine and diphenyl terephthalate, with aromatic dicarboxylic acid.

The amount of the urethane acrylate resin and the polyamide resin that are mixed is not particularly limited. However, preferably, the urethane acrylate resin and the polyamide resin are mixed at a weight ratio of 1:1 to 5:1, and preferably 2:1 to 3:1. When the amount of the polyamide resin that is mixed is very small, the compatibility of the adhesive is reduced during the molding process, which reduces the durability of the manufactured ceramic panel. When the amount of the polyamide resin that is mixed is very large, the adhesive strength thereof is reduced, thus reducing the durability of the manufactured ceramic panel.

Further, in the process of mixing the non-phenolic adhesive, colored pigments or oils may be added as described above. As the colored pigment, it is preferable to use an inorganic pigment in consideration of the temperature and pressure of the molding process, and the inorganic pigment may be appropriately mixed at a content of 5 to 10 wt % based on the total weight of the ceramic panel, in consideration of the color of the panel. Further, as the oil, silicone oil or fluorocarbon-based oil may be used. The oil may be contained at a content of 0.5 wt % or less, and preferably 0.1 to 0.5 wt %, based on the total weight of the ceramic panel. A small amount of oil may be included to improve dispersibility and compatibility.

Further, it is preferable that the non-phenolic adhesive be mixed at a content of 5 to 10 parts by weight based on 100 parts by weight of the mixture. When the content of the adhesive is very high, moldability may be reduced and harmful chemicals may be detected in the manufactured ceramic panel depending on the type of the raw material of the adhesive. When the content of the adhesive is very low, the durability of the manufactured ceramic panel is reduced due to the poor adhesive strength thereof. Accordingly, it is preferable to use the adhesive within the above-described content range.

Further, as the above oil, oil containing a coupling agent collected therein may be used. When this oil is mixed, the coupling agent may be eluted during the molding process, which promotes the polymerization process of the urethane acrylate resin and the polyamide resin, whereby the effect of the adhesive is further increased.

In the case of the coupling agent, isocyanate silane or amino silane may be used so as to promote the polymerization of the urethane acrylate resin and the polyamide resin. Examples of the silane coupling agent may include any one isocyanatesilane among 3isocyanatopropyldimethylchlorosilane, 3-isocyanatopropyltriethoxysilane, 3isoyanatopropyltrimethoxysilane, and (isocyanatomethyl) methyldimethoxysilane; and any one aminosilane among 4-aminobutyltriethoxysilane, 1-amino-2-(dimethylethoxysilyl)propane, N-(2-aminoethyl)-3-aminopropyltriethoxysilane, 3-aminopropyldiisopropylethoxysilane, 3-aminopropyldimethylethoxysilane, 3-aminopropylmethydiethoxysilane, 3-aminopropyltriethoxysilane, bis (2-hydroxyethyl)-3-aminopropyltriethoxysilane, bis (methyldiethoxysilylpropyl) amine, bis (triethoxysilylpropyl) amine, 3-(2, 4-dinitrophenylamino) propyltriethoxysilane, N-ethylaminoisobutylmethyldiethoxysilane, N-(3-methacryloxy-2-hydroxypropyl)-3-aminopropyltriethoxysilane, N-methylaminopropylmethyldimethoxysilane, N-methylaminopropyltrimethoxysilane, and N-phenylaminomethyltriethoxysilane.

A method of collecting the coupling agent in oil may include a typical droplet-forming process using water/oil phases. It is preferable that the content of the coupling agent do not exceed 40 wt % based on the total weight of the droplet. The coupling agent may not be wholly collected in the oil. When mixing is performed so that the content of the coupling agent exceeds 40 wt %, the content of the coupling agent that is not collected is excessively increased, so polymerization may begin to occur before the molding process or in the initial stage of the molding process, which reduces the dispersion and adhesive strength of the adhesive.

In an embodiment, 70 parts by weight of crushed granite and 30 parts by weight of dolomite were mixed to manufacture a stone dust mixture, and 60 parts by weight of the stone dust mixture and 40 parts by weight of slag powder were mixed to manufacture a mixture. The manufactured mixture was put into a pellet maker to manufacture pellets having a size of 20 to 30 mm.

The pellets were put into an electric furnace and melted at 1,350° C., and then the molten substance was put into a high-speed turbine to perform fiberizing. The fiberized material had a density of 90 kg/m³, an average thickness of 5 μm, and an average length of 120 mm.

Further, in order to manufacture the non-phenolic adhesive, 35 parts by weight of methylene diphenyl diisocyanate was added to 79 parts by weight of polyoxypropylene glycol, having a weight average molecular weight of 800, followed by reaction (using 3 parts by weight of diethylene glycol as a chain extender), thus manufacturing a liquid urethane acrylate resin having a weight average molecular weight of 5,000.

Further, 62 parts by weight of diphenyl terephthalate was reacted with 75 parts by weight of trimethylenediamine to manufacture a polyamide resin having a weight average molecular weight of 20,000.

After the urethane acrylate resin and the polyamide resin were mixed at a weight ratio of 2:1 and heated to manufacture a mixed solution, the mixed solution was molded to manufacture beads of about 30 µm.

The fiberized material and the beads were mixed at a weight ratio of 9:1 and then molded using a rolling mill to manufacture a panel. A panel (panel 1) cut to a size of 950×1,500 mm and a panel (panel 2) cut to a size of 600×2,500 mm were tested and evaluated by the Korea Institute of Civil Engineering and Building Technology.

The ceramic panel was subjected to a wind-pressure resistance test according to ASTM E330 (Test method: 4-sided piece fixation). The evaluation criterion of the panel having a size of 950×1,500 mm must be 15.8 mm or less under the conditions of a positive pressure of +207.4 kgf/m$^2$ and a negative pressure of −391.3 kgf/m$^2$, and the evaluation criterion of the panel having a size of 600×2,500 mm must be 10.0 mm or less under the conditions of a positive pressure of +207.4 kgf/m$^2$ and a negative pressure of −391.3 kgf/m$^2$. As a result of the test, panel 1 was 10.5 mm and panel 2 was 8.6 mm, showing excellent results for the wind-pressure resistance test.

Further, an incombustibility test was performed according to KS F ISO 1182. Measurement was performed for 20 minutes after the start of heating to 750° C., the difference between the highest temperature and the final equilibrium temperature must be 20° C. or less, and a mass reduction rate must be 30% or less. As a result of the test, in the case of the ceramic panel of the present invention, the difference between the highest temperature and the final equilibrium temperature was 10.3° C. and the mass reduction rate was 14.5%, which showed excellent combustion resistance, thereby satisfying the criterion of incombustibility.

Further, a gas hazard test was performed according to KS F 2271. The elapsed time from when combustion gas entered a specimen to when a mouse's behavior stopped was measured, and a time of 9 minutes or more is considered satisfactory. As a result of the test, in the case of the ceramic panel of the present invention, the average behavior-stop time of the mouse was 10 minutes or more, and thus an excellent result was observed with regard to gas hazard.

Further, a limited-combustible property test was performed according to KS F ISO 5660-1. Measurement was performed for 10 minutes after the specimen heating test was started. The criterion that the time, for which a heat emission rate continuously exceeds the maximum heat emission rate of 200 kW/m$^2$, is 10 seconds or less when the total heat emission rate is 8 MJ/m$^2$ or less must be satisfied. As a result of the test, in the case of the ceramic panel of the present invention, the total heat emission rate was 7.5 MJ/m$^2$, and the time for which the heat emission rate continuously exceeded 200 kW/m$^2$ was 0 seconds, showing that the limited-combustible property was satisfied.

Further, for the purpose of comparison, beads about 30 µm in size, obtained by molding the urethane acrylate resin, and beads about 30 µm in size, obtained by mixing the urethane acrylate resin and the polyamide resin at a weight ratio of 7:1 and then molding the resultant mixture, were used as adhesives, thus manufacturing panel 3 and panel 4, having the same size as panel 1.

In the case of panels 3 and 4, all of the properties of incombustibility, gas hazard, and limited-combustible property satisfied the evaluation criteria. However, in the wind-pressure resistance test, panel 1 was 15.2 mm and panel 2 was 12.6 mm, meaning that the strength of the panel was insufficient. From these results, it could be confirmed that the strength of the obtained panel varies depending on the type of adhesive that is used when the ceramic panel is manufactured and that the adhesive composition according to the present invention is effective for manufacturing the ceramic panel.

Further, in the case of the manufacture of panel 1, when a ceramic panel, including the silicone oil containing 20 to 25 wt % of 3-isocyanatopropyldimethylchlorosilane collected therein so that the content of 3-isocyanatopropyldimethylchlorosilane was 0.2 wt % based on the total weight of the ceramic panel, was manufactured, the result of the wind-pressure resistance test, which was originally 10.5 mm, was reduced to 9.2 mm, indicating a significant improvement.

Further, a radon-gas-emission measurement test of the ceramic panel (panel 1) was performed based on radon measurement of a test object using an HNQI-15 sealed chamber. In the above measurement test, measurement of the specimen was continuously performed for 48 hours after the start of measurement, and the result must satisfy 148 Bq/m$^3$ or less which is a domestic indoor statutory standard for radon. As a result of the above test, the ceramic panel of the present invention exhibited a value of 14.4 Bq/m$^3$, showing an excellent result of 10% or less of the statutory standard of radon.

As a result of provision of the above ceramic panel on the radon-gas moving passage of a concrete wall, it was found that the radon gas was discharged smoothly without leaking into the room. This is considered to be because the ceramic panel according to the present invention has excellent airtightness despite the low density thereof.

The present invention has been described with reference to preferred embodiments as described above, but is not limited to the above embodiments, and various modifications and changes are possible by those skilled in the art to which the invention pertains without departing from the spirit of the present invention. Such modified and changed examples are to be regarded as falling within the scope of the present invention and appended claims.

What is claimed is:

1. A ceramic panel comprising:
   a mixture including slag and two or more stone dust selected from among granite, basalt, limestone, dolomite, elvan, black stone, feldspar, and sandstone; and
   a non-phenolic adhesive,
   wherein the non-phenolic adhesive includes resin beads having a urethane acrylate resin and a polyamide resin,
   wherein the urethane acrylate resin and the polyamide resin are at a weight ratio of 1:1 to 5:1,
   wherein the mixture includes the slag and the two or more stone dust mixed at a weight ratio of 3:7 to 5:5, and
   wherein the mixture is a fiberized material having a density of 80 to 100 kg/m$^3$, and the ceramic panel has a thickness of 5 to 30 mm and a density of 600 to 1,500 kg/m$^3$.

* * * * *